(12) United States Patent
Geng et al.

(10) Patent No.: US 11,245,146 B2
(45) Date of Patent: Feb. 8, 2022

(54) CELL AND PACKAGE DEVICE

(71) Applicant: Dongguan Amperex Technology Limited, Guangdong (CN)

(72) Inventors: Zhaochun Geng, Guangdong (CN); Yangang Hu, Guangdong (CN); Weipeng Pi, Guangdong (CN); Yifan Liu, Guangdong (CN)

(73) Assignee: DONGGUAN AMPEREX TECHNOLOGY LIMITED, Guangdong (CN)

( * ) Notice: Subject to any disclaimer, the term of this patent is extended or adjusted under 35 U.S.C. 154(b) by 138 days.

(21) Appl. No.: 16/432,912

(22) Filed: Jun. 5, 2019

(65) Prior Publication Data

US 2020/0152924 A1 May 14, 2020

(30) Foreign Application Priority Data

Nov. 14, 2018 (CN) .......................... 201821875026.0

(51) Int. Cl.
*H01M 50/116* (2021.01)
*H01M 50/103* (2021.01)
*H01M 50/131* (2021.01)

(52) U.S. Cl.
CPC ....... *H01M 50/116* (2021.01); *H01M 50/103* (2021.01); *H01M 50/131* (2021.01); *H01M 2220/30* (2013.01)

(58) Field of Classification Search
CPC .. H01M 2/026; H01M 2/0217; H01M 50/116; H01M 50/103
See application file for complete search history.

(56) References Cited

U.S. PATENT DOCUMENTS

| | | | |
|---|---|---|---|
| 6,451,474 B1 * | 9/2002 | Kozu ..................... | H01M 10/48 429/100 |
| 2011/0033734 A1 * | 2/2011 | Chamberlain, II ..... | H01M 2/26 429/53 |
| 2012/0034506 A1 * | 2/2012 | Hu ....................... | H01M 2/1061 429/100 |

* cited by examiner

*Primary Examiner* — Olatunji A Godo
(74) *Attorney, Agent, or Firm* — Morgan, Lewis & Bockius LLP

(57) ABSTRACT

The application provides a cell and a package device. The cell comprises a first end surface including a flat portion and a recess portion, and the flat portion and the recess portion are spaced apart from each other. The purpose of the present application is to provide a cell and a package device, which can overcome the disadvantages on the surface of the planar sealing head of the conventional package device, and improve the package efficiency and reliability of the battery.

21 Claims, 7 Drawing Sheets

CELL AND PACKAGE DEVICE

CROSS-REFERENCE TO RELATED APPLICATION

This application claims priority to and benefits of Chinese Patent Application Serial No. 201821875026.0, filed with the China National Intellectual Property Administration on Nov. 14, 2018, and the entire content of which is incorporated herein by reference.

FIELD OF THE APPLICATION

The present application relates to the field of battery, in particular, to a cell and a package device.

BACKGROUND OF THE APPLICATION

Consumer electronics products are getting closer and closer to people's daily lives and are used almost every day. The consequent safety incidents in use are also increasing, and lithium batteries are necessary devices for supplying electrical energy to electronic products, so the market demand for battery safety is increasing. In addition, in order to improve battery safety and improve the consumer experience, the lithium ion cells are required more reliable package technology. In the production process of lithium batteries, an important process is to bond two layers of aluminum plastic film together, so that the inside of the lithium battery is completely isolated from the outside world to prevent the entry of outside oxygen and moisture. The process is mainly packaging by heating and pressing using two conventional flat sealing head surfaces. For this type of package method, there is low package reliability during the package process, and the package is corroded and damaged, resulting in liquid leakage or even the entire battery failure.

SUMMARY OF THE APPLICATION

In view of the problems in the background art, the purpose of the present application is to provide a cell and a package device, which can overcome the disadvantages on the surface of the planar sealing head of the conventional package device, and improve the package efficiency and reliability of the battery.

The technical solution of the present application is implemented as follows:

According to an aspect of the present application, a cell is provided. The cell includes a first end surface including a plurality of flat portions and a plurality of recess portions. Each of the plurality of flat portions are spaced apart from each other, and each of the plurality of recess portions are spaced apart from each other.

According to an embodiment of the present application, the plurality of recess portions includes a first recess portion and a second recess portion. And, the plurality of flat portions includes a first flat portion and a second flat portion. The first recess portion and the second recess portion are spaced apart from each other by the first flat portion.

According to an embodiment of the present application, the first flat portion and the second flat portion are spaced apart from each other by the second recess portion.

According to an embodiment of the present application, a depth of the first recess portion is greater than or equal to 0.001 mm and less than or equal to 0.5 mm. And a depth of the second recess portion is greater than or equal to 0.001 mm and less than or equal to 0.5 mm.

According to an embodiment of the present application, a structure of the first recess portion is different from that of the second recess portion.

According to an embodiment of the present application, each of the plurality of the recess portions has a bottom in the shape of polygon.

According to an embodiment of the present application, the polygon is at least one of triangle, parallelogram, and hexagon.

According to an embodiment of the present application, a structure of the first recess portion is the same as that of the second recess portion.

According to an embodiment of the present application, a shape of the first recess portion is different from that of the second recess portion.

According to an embodiment of the present application, a size of the first recess portion is different from that of the second recess portion.

According to another aspect of the present application, a package device is further provided, the package device includes a functional surface including a plurality of functional flat portions and a plurality of functional recess portions. Wherein each of the functional flat portions are spaced apart from each other. And, each of the functional recess portions are spaced apart from each other.

According to an embodiment of the present application, the functional flat portion includes a first functional flat portion and a second functional flat portion, and the first functional flat portion and the second functional flat portion have the same structure.

According to an embodiment of the present application, a shape of the first functional flat portion is different from that of the second functional flat portion.

According to an embodiment of the present application, a size of the first functional flat portion is different from that of the second functional flat portion.

According to an embodiment of the present application, the shape of the functional flat portion is a polygon.

According to an embodiment of the present application, the polygon is at least one of triangle, parallelogram, and hexagon.

According to an embodiment of the present application, the plurality of functional recess portions includes a first functional recess portion and a second functional recess portion; and a structure of the first functional recess portion is different from that of the second functional recess portion.

According to an embodiment of the present application, the plurality of functional recess portions includes a first functional recess portion and a second functional recess portion; and the first functional recess portion and the second functional recess portion are spaced apart from each other by the first functional flat portion.

According to an embodiment of the present application, the plurality of functional recess portions includes a first functional recess portion and a second functional recess portion; and the first functional flat portion and the second functional flat portion are spaced apart from each other by the second functional recess portion.

According to an embodiment of the present application, a depth of the first functional recess portion is greater than or equal to 0.001 mm and less than or equal to 0.5 mm; and a depth of the second functional recess portion is greater than or equal to 0.001 mm and less than or equal to 0.5 mm.

According to an embodiment of the present application, the functional flat portion includes a first functional flat portion and a second functional flat portion. The functional recess portion includes a first functional recess portion and a second functional recess portion, the first functional flat portion and the second functional flat portion are discontinuous and spaced apart from each other by the first functional recess portion.

According to an embodiment of the present application, the first functional recess portion and the second functional recess portion are discontinuous and are spaced apart from each other by the second functional flat portion.

According to an embodiment of the present application, the depths of the first functional recess portion and the second functional recess portion are both greater than or equal to 0.001 mm and less than or equal to 0.5 mm.

According to an embodiment of the present application, the structures of the first functional flat portion and the second functional flat portion are different.

According to an embodiment of the present application, the functional flat portion is presented as a polygonal.

According to an embodiment of the present application, the functional flat portion is at least one of a triangle, a parallelogram, and a hexagon.

The beneficial effects of the present application are at least:

Since the first end surface of the cell includes a flat portion and a recess portion, the air bubbles generated during the package process may be discharged along the recess portion of the first end surface, and the recess portion of the cell may accommodate the overflow glue to prevent the overflow of the glue from encroaching on the unpackaged region. The flat portion and the recess portion of the first end surface also enable the polymer layer of the aluminum plastic film to be more stably fused, preventing the problem of insufficient local polymer layer fusion caused by unevenness of the aluminum plastic film, further preventing package failure caused by insufficient package tension. Due to the improved package reliability, the air passage in the unpackaged region inside the cell may be unblocked, and the user may be better protected during use. Therefore, the aluminum plastic film of the cell provided by the present application may be firmly bonded, and the potential factor that may pierce the aluminum film is avoided, thereby improving the reliability of the battery package, enhancing the using safety of the cell (e.g., safety performance in abnormal use environments such as falling and strong impacting), and avoiding the adverse effects on clients and consumers. In addition, the structure of the first end surface does not affect the performance of the cell, and has the advantages of easy processing, short package time, and improved package efficiency.

Since the functional surface of the package device includes a functional flat portion and a functional recess portion, the air bubbles generated during the package process may be discharged along the functional recess portion of the functional surface, and the functional recess portion of the cell may accommodate the overflow glue to prevent the overflow of the glue from encroaching on the unpackaged region. The functional flat portion and the functional recess portion of the functional surface also enable the polymer layer of the aluminum plastic film of the cell to be more stably fused, preventing the problem of insufficient local polymer layer fusion caused by unevenness of the aluminum plastic film, further preventing package failure caused by insufficient package tension. Due to the improved package reliability, the air passage in the unpackaged region inside the cell may be unblocked, and the user may be better protected during the usage of the cell. Therefore, the package device provided by the present application may be firmly bonded, and the potential factor that may pierce the aluminum film is avoided, thereby improving the reliability of the battery package, enhancing the using safety of the cell (e.g., safety performance in abnormal use environments such as falling and strong impacting), and avoiding the adverse effects on clients and consumers. In addition, the package device does not affect the performance of the cell, and has the advantages of easy processing, short package time, convenient installation, and improved package efficiency.

BRIEF DESCRIPTION OF THE ACCOMPANYING DRAWINGS

In order to illustrate the technical schemes in the embodiments of the present disclosure or in the prior art more clearly, the drawings which are required to be used in the description of the embodiments of the present disclosure are briefly described below. It is obvious that the drawings described below are only some embodiments of the present disclosure. It is apparent to those of ordinary skill in the art that other drawings may be obtained based on the accompanying drawings without inventive effort.

FIG. 2b is an enlarged view of A1 in FIG. 2a;

FIG. 6b is an enlarged view of B1 in FIG. 6a;

DETAILED DESCRIPTION OF THE EMBODIMENTS

Figure 1:
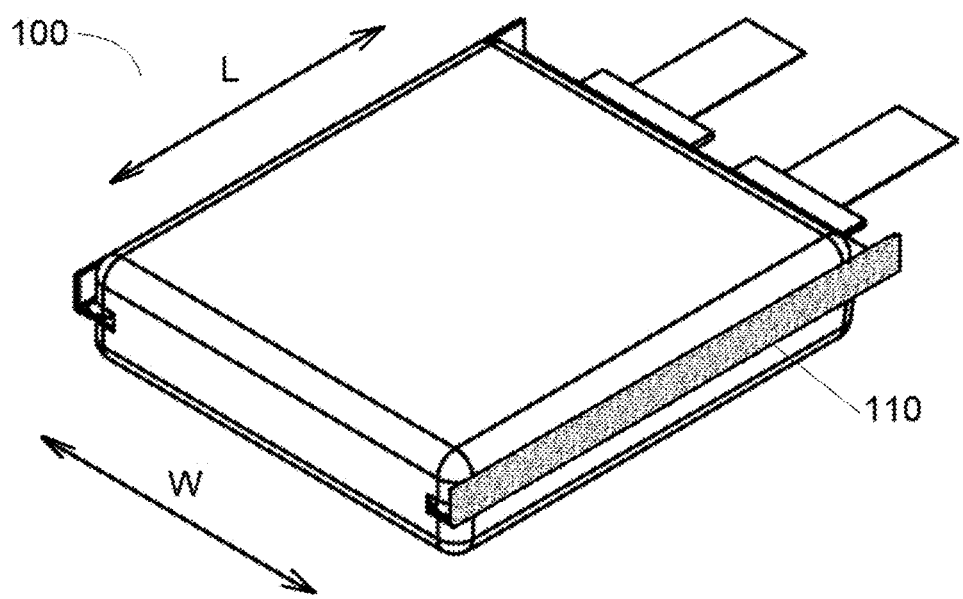
FIG. 1 is a front view of the cell according to an embodiment of the present application.

The technical schemes of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure. Based on the embodiments of the present application, all the other embodiments obtained by those of ordinary skill in the art are within the scope of the present application.

The embodiments of the present application will be specifically described below in conjunction with the accompanying drawings. Among them, the feature defined by '1st', '2nd' can explicitly or implicitly include one or more characteristics. In this application, unless otherwise stated, the meaning of 'a plurality of' is two or more. It should be noted that the following various embodiments may be combined or partially replaced with each other in any possible manner. Also, in the various drawings of the present application, like components have the same reference numerals.

In the related art, in terms of improving the reliability of a package using a flat sealing head surface, various combinations of package parameters are optimized in the related art, for example, increasing the sealing head pressure, increasing the package temperature, etc. However, the following defects still exist in the package process: first of all, the bubbles generated in the package region may not be excluded and are sealed inside the package, and over time, the reliability of the package is lowered, the package corrosion is easily broken, and liquid leakage occurs, and even the entire battery fails; secondly, the surface of the flat sealing head may not avoid the overflow of the unpackaged region inside the package, and the overflow will flow to the side of the bare cell and encroach on the unpackaged region, resulting great safety hazard caused by poor gas flow during the use of the lithium battery, battery bulging or explosion; thirdly, the reliability of the surface of the flat sealing head is greatly related to the parallelism of the upper and lower sealing heads, which results in insufficient polymer layer fusion of the aluminum plastic film in a part of the package position after the sealing head wears, and insufficient package strength, thereby causing damage and leakage during use which makes the entire battery fail and affect safety.

At the same time, raising the pressure and temperature of the sealing head may cause the following problems. Firstly, the excessive pressure may cause the thickness of the package region to be insufficient, and the polymer layer in the molten state is excessively squeezed, resulting in insufficient package pulling force and a large safety hazard. Secondly, the temperature increase will cause invisible damage to the outermost layer of the aluminum plastic film, which may lead to damage in subsequent use and affect the safety of the battery.

Figure 2A:
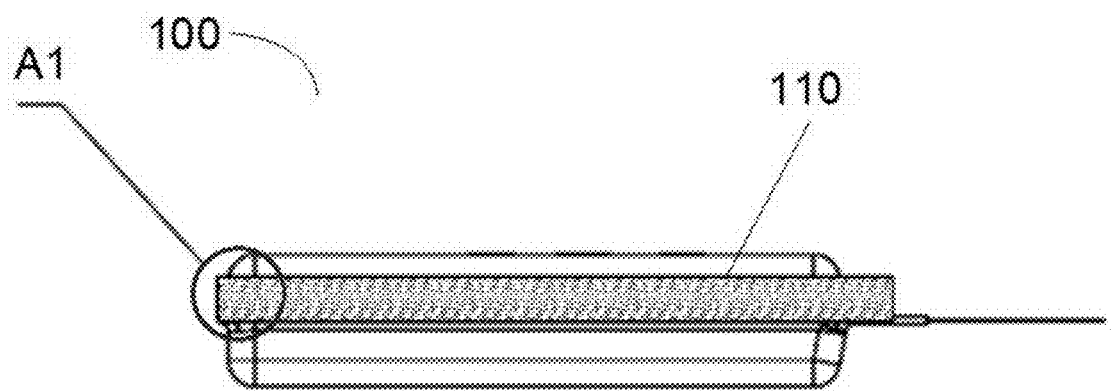
FIG. 2a is a side view of the cell according to an embodiment of the present application.
Figure 2B:
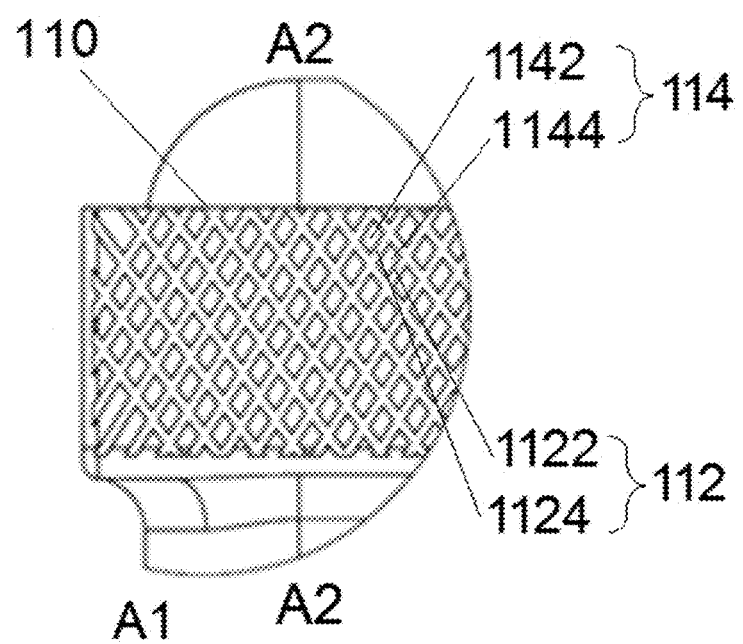

As shown in FIGS. 1, 2a and 2b, the present application provides a cell 100. The cell 100 includes a first end surface 110, and the cell 100 is packaged through the first end surface 110. The first end surface 110 includes a flat portion 112 and a recess portion 114, and the flat portion 112 and the recess portion 114 are spaced apart from each other. The first end surface 110 is shown as an end surface in the length direction L of the cell 100 in FIG. 1. It should be understood that according to a specific application, the first end surface 110 may include any end surface in the length direction L of the cell 100, and the first end surface 110 may also include any one of the end surfaces in the width direction W of the cell 100, which are not limited in this application.

In above embodiment, since the first end surface 110 includes a flat portion 112 and a recess portion 114, the air bubbles generated during the package process may be discharged along the recess portion 114 of the first end surface 110, and the recess portion 114 may accommodate the overflow glue to prevent the overflow of the glue from encroaching on the unpackaged region. The flat portion 112 and the recess portion 114 of the first end surface 110 also enable the polymer layer of the aluminum plastic film to be more stably fused, preventing the problem of insufficient fusion of the local polymer layer caused by unevenness of the aluminum plastic film, further preventing package failure caused by insufficient package tension. Due to the improved package reliability, the air passage in the unpackaged region inside the cell may be unblocked, and the user may be better protected during the usage. Therefore, the aluminum plastic film of the cell provided by the present application may be firmly bonded, and the potential factor that may pierce the aluminum film is avoided, thereby improving the reliability of the battery package, enhancing the using safety of the cell (e.g., safety performance in abnormal use environments such as falling and strong impacting), and avoiding the adverse effects on clients and consumers. In addition, the structure of the first end surface 110 does not affect the performance of the cell, and has the advantages of easy processing, short package time, and improved package efficiency.

Further referring to FIG. 2b, the recess portion 114 includes a first recess portion 1142 and a second recess portion 1144, and the flat portion 112 includes a first flat portion 1122 and a second flat portion 1124; the first recess portion 1142 and the second recess portion 1144 are discontinuous, and the first recess portion 1142 and the second recess portion 1144 are spaced apart from each other by the first flat portion 1122.

In addition, the first flat portion 1122 and the second flat portion 1124 are discontinuous, and the first flat portion 1122 and the second flat portion 1124 are spaced apart from each other by the second recess portion 1144. Such a recess portion 114 and the flat portion 112 are disposed in such a manner that the appearance of the packaged first end surface 110 does not change significantly, so that the product appearance of the cell of the present application is not significantly different from that of the conventional cell.

In an embodiment, the structures of the first recess portion 1142 and the second recess portion 1144 may be the same. In an embodiment, the structures of the first recess portion 1142 and the second recess portion 1144 may be different. In an embodiment, the shapes of the first recess portion 1142 and the second recess portion 1144 are different. In an embodiment, the sizes of the first recess portion 1142 and the second recess portion 1144 are different.

Figure 2C:
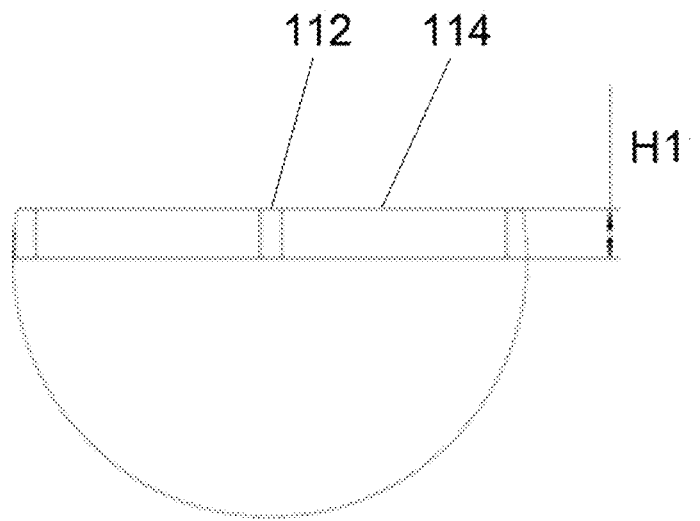
FIG. 2c is a cross-sectional view taken along line A2-A2 of FIG. 2b.

As shown in FIG. 2c, in some embodiments, the depths H1 of the first recess portion 1142 and the second recess portion 1144 are both greater than or equal to 0.001 mm and less than or equal to 0.5 mm. Depending on the specific application, the depth H1 of the recess portion 114 may be arbitrarily set as appropriate, which is not limited in the present application.

Figure 3:
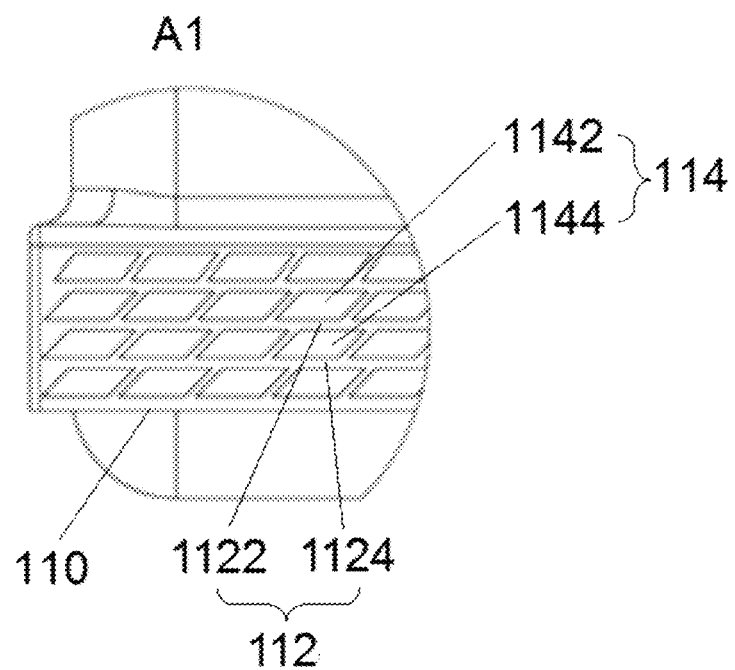
FIGS. 3 to 5 are enlarged views of a first end surface A1 of a cell according to various embodiments of the present application.
Figure 4:
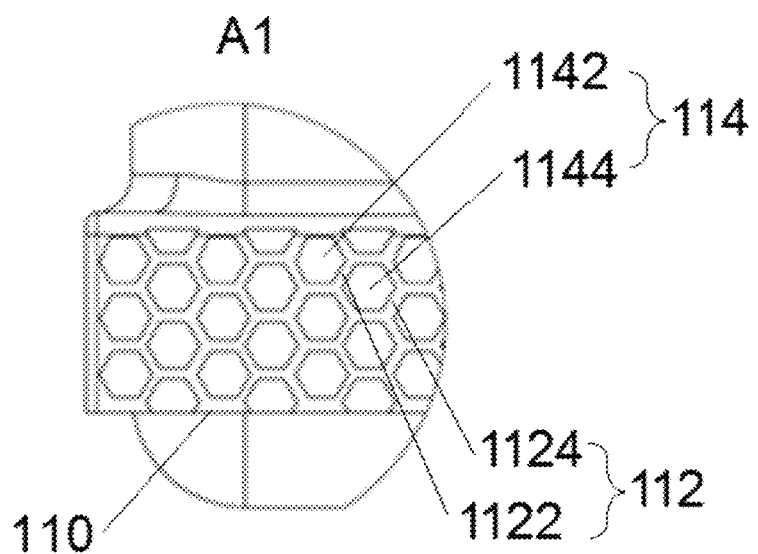
Figure 5:
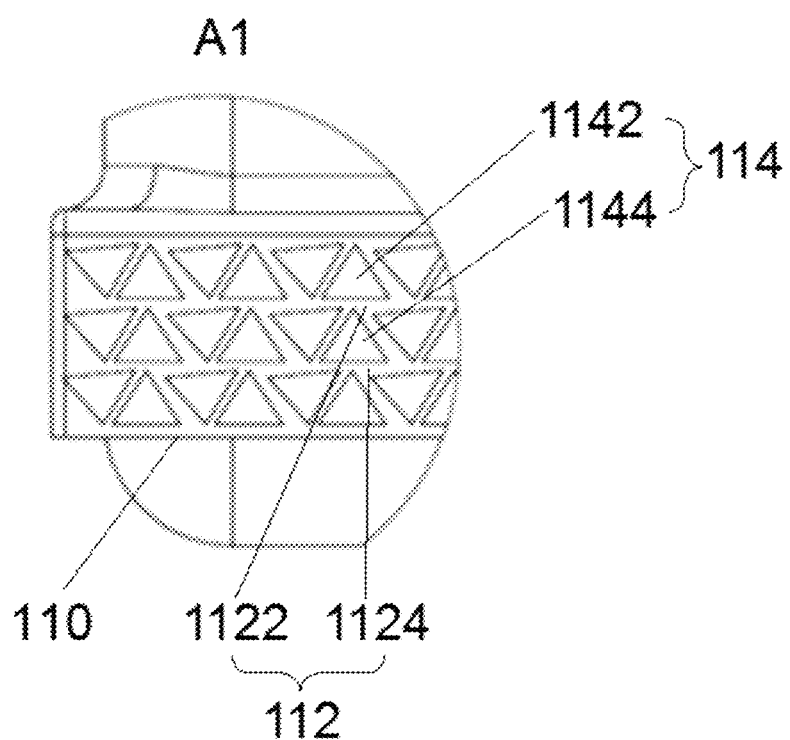

As shown in FIGS. 2b and 3 to 5, the bottom of the recess portion 114 has a polygonal shape. In an embodiment, the bottom of the recess portion 114 is at least one of a triangle, a parallelogram, and a hexagon. As shown in FIGS. 2b and 3, the bottom of the recess portion 114 has a parallelogram shape. As shown in FIG. 4, the bottom of the recess portion 114 has a hexagonal shape. As shown in FIG. 5, the bottom of the recess portion 114 has a triangular shape. It should be understood that FIGS. 2b and 3 to 5 show only a plurality of examples of the first end surface 110, and the structure of the first end surface 110 is not limited to these examples. The bottom of the recess portion 114 may be any other suitable shape and the shapes may be combined in any implementable manner.

Figure 6A:
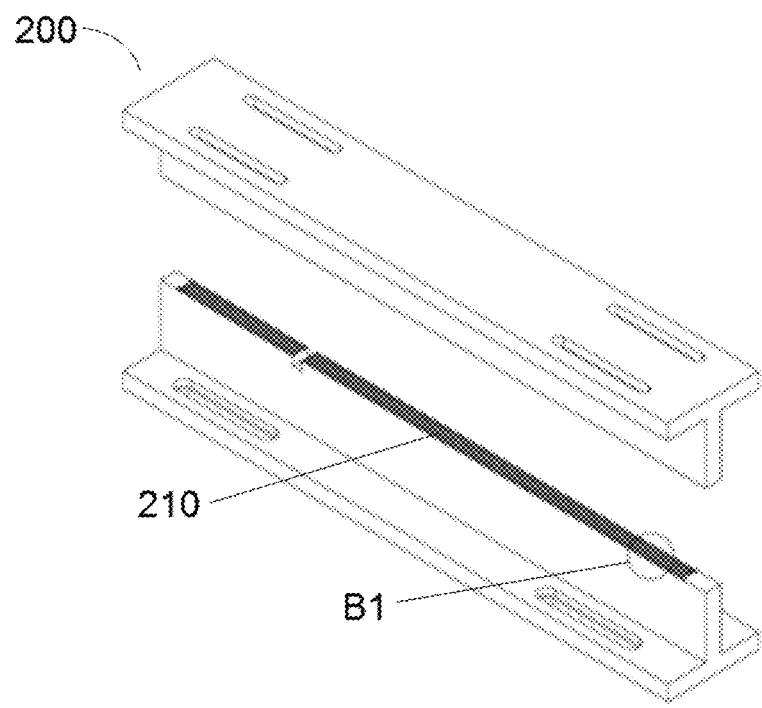
FIG. 6a is a front view of the package device according to an embodiment of the present application.
Figure 6B:
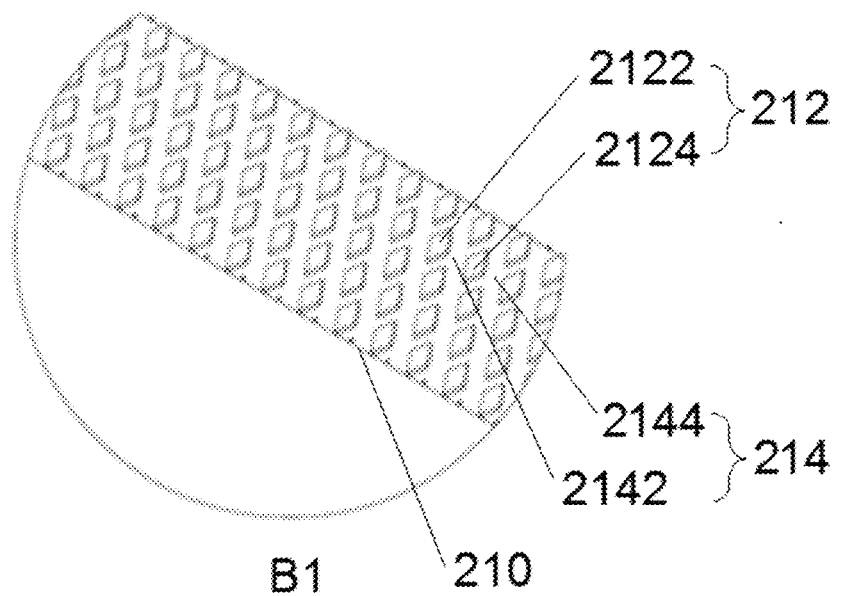

Referring to FIGS. 6a and 6b, the present application further provides a package device 200 including a functional surface 210, and the package device 200 may package the cell through the functional surface 210. The functional surface 210 includes a functional flat portion 212 and a functional recess portion 214, and the functional flat portion 212 and the functional recess portion 214 are spaced apart from each other. It should be understood that the functional flat portion 212 on the functional surface 210 of the package device 200 is used to form the recess portion 114 on the first end surface 110 of the cell 100, and the functional recess portion 214 on the functional surface 210 of the package device 200 is used to form the functional flat portion 112 on the first end surface 110 of the cell 100.

In above embodiment, since the functional surface 210 of the package device includes a functional flat portion 212 and a functional recess portion 214, the air bubbles generated during the package process may be discharged along the functional recess portion 214 of the functional surface 210, and the functional recess portion 214 may accommodate the overflow glue to prevent the overflow of the glue from encroaching on the unpackaged region. The functional flat portion 212 and the functional recess portion 214 of the functional surface 210 also enable the polymer layer of the aluminum plastic film of the cell to be more stably fused, preventing the problem of insufficient local polymer layer fusion caused by unevenness of the aluminum plastic film, further preventing package failure caused by insufficient package tension. Due to the improved package reliability, the air passage in the unpackaged region inside the cell may be unblocked, and the user may be better protected during the usage of the cell. Therefore, the package device provided by the present application may be firmly bonded, and the potential factor that may pierce the aluminum film is avoided, thereby improving the reliability of the battery package, enhancing the using safety of the cell (e.g., safety performance in abnormal use environments such as falling and strong impacting), and avoiding the adverse effects on clients and consumers. In addition, the package device does not affect the performance of the cell, and has the advantages of easy processing, short package time, convenient installation, and improved package efficiency.

Further referring to FIG. 6b, the functional flat portion 212 includes a first functional flat portion 2122 and a second functional flat portion 2124; the first functional flat portion 2122 and the second functional flat portion 2124 are discontinuous, and the first functional flat portion 2122 and the second functional flat portion 2124 are spaced apart from each other by the functional recess portion 214.

In addition, the functional recess portion 214 includes a first functional recess portion 2142 and a second functional recess portion 2144; the first functional recess portion 2142 and the second functional recess portion 2144 are discontinuous, and the first functional recess portion 2142 and the second functional recess portion 2144 are spaced apart from each other by the functional flat portion 212. Such a functional recess portion 214 and the functional flat portion 212 are disposed in such a manner that the product appearance of the cell packaged by the package device is not significantly different from the appearance of the conventional cell.

In some embodiments, the first functional flat portion 2122 and the second functional flat portion 2124 have the same structure. In an embodiment, the first functional flat portion 2122 and the second functional flat portion 2124 may have different structures. In an embodiment, the first functional flat portion 2122 and the second functional flat portion 2124 may have different shapes. In an embodiment, the first functional flat portion 2122 and the second functional flat portion 2124 may have different sizes.

Figure 6C:
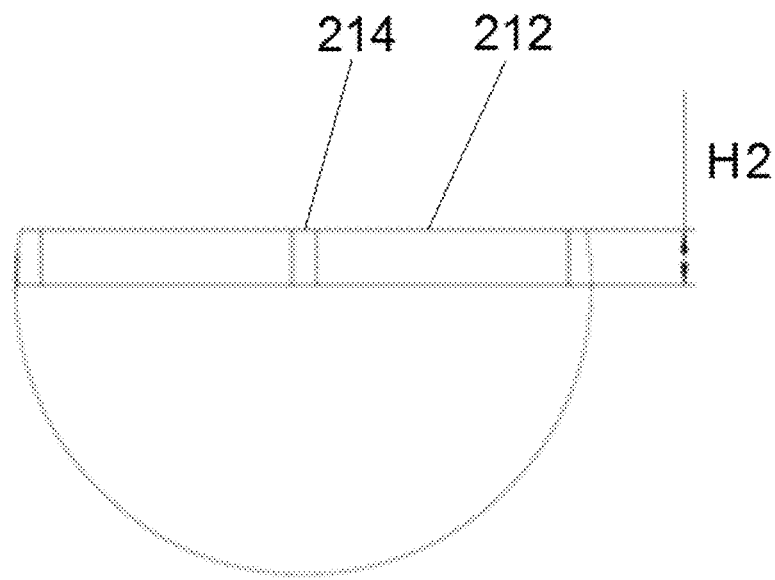
FIG. 6c is a section view of the functional surface of the package device according to an embodiment of the present application.

As shown in FIG. 6c, in some embodiments, the depths H2 of the first functional recess portion 2142 and the second functional recess portion 2144 are both greater than or equal to 0.001 mm and less than or equal to 0.5 mm. Depending on the specific application, the depth H2 of the functional recess portion 214 may be arbitrarily set as appropriate, which is not limited in the present application.

Figure 7:
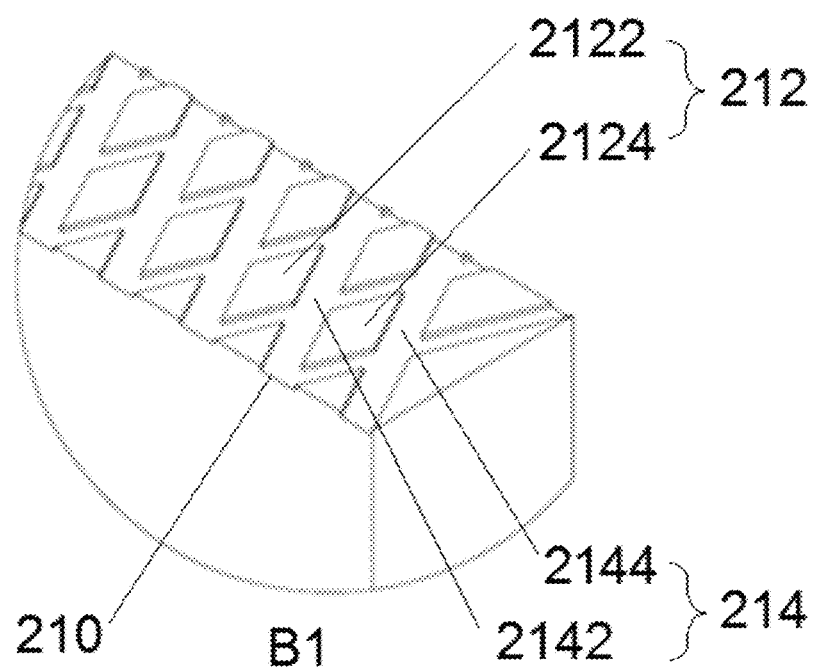
FIGS. 7 to 9 are enlarged views of a functional surface B1 of a package device according to various embodiments of the present application.
Figure 8:
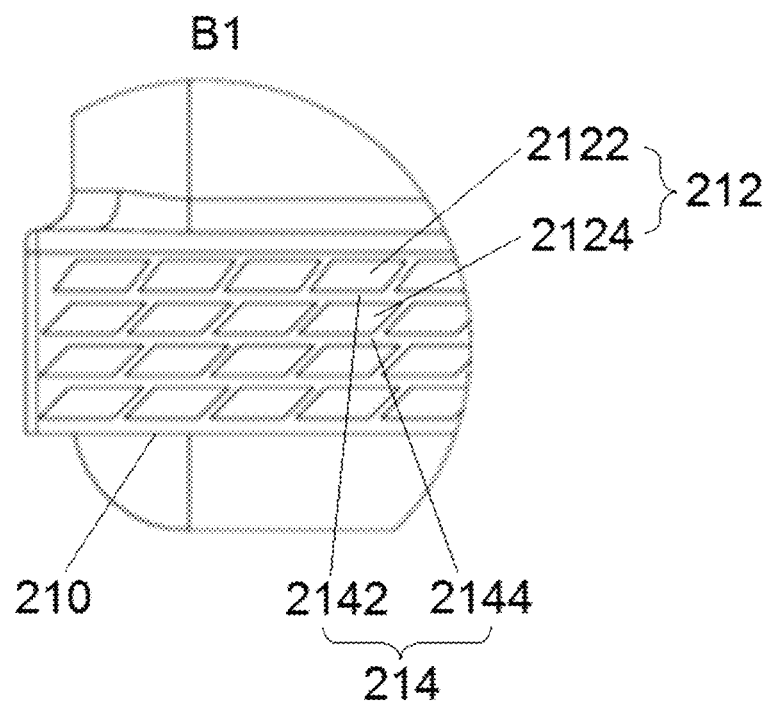
Figure 9:
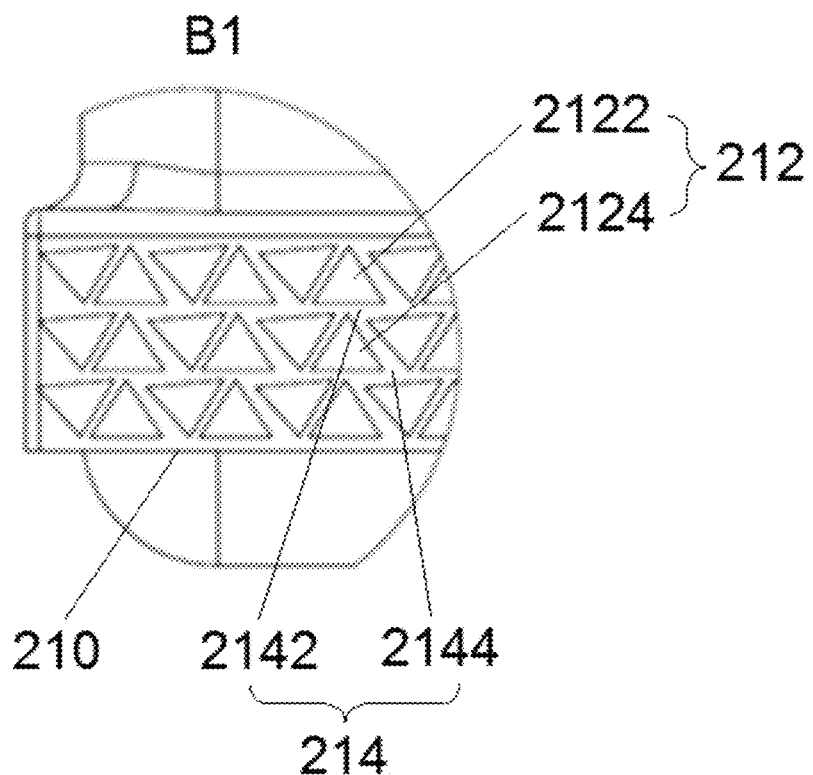

As shown in FIGS. 6b and 7 to 9, the functional flat portion 212 has a polygonal shape. In some embodiments, the functional flat portion 212 is in a shape of at least one of a triangle, a parallelogram, and a hexagon. As shown in FIGS. 6b, 7 and 8, the functional flat portion 212 has a parallelogram shape. As shown in FIG. 9, the functional flat portion 212 has a triangular shape. It should be understood that FIGS. 6b and 7 to 9 show only a plurality of examples of the functional surface 210, and the structure of the functional surface 210 is not limited to these examples. The functional flat portion 212 may have any other suitable shape and the shapes may be combined in any implementable manner.

The above is only the preferred embodiment of the present application and is not intended to limit the present application. Although the preferred embodiments of the present application have been shown and described, it can be understood that a person skilled in the art can make various changes, modifications, substitutions and variations to the embodiments without departing from the principle and spirit of the present application; and the scope of the present application is defined by the attached claims and equivalents thereof.

What is claimed is:

1. A cell, comprising a package having a top sealed portion and two sealed wings formed by bonding two package films,
   the top sealed portion including two electrode tabs extending out of the package in a length direction of the cell, and
   the two sealed wings located on two opposite sides of the top sealed portion along the length direction of the cell and each sealed wing having a first end surface extending in the length direction of the cell and including a plurality of flat portions and a plurality of recess portions;
   wherein each of the plurality of flat portions are spaced apart from each other, and each of the plurality of recess portions are spaced apart from each other.

2. The cell according to claim 1, wherein the plurality of recess portions comprises a first recess portion and a second recess portion, the plurality of flat portions comprises a first flat portion and a second flat portion; and,
   the first recess portion and the second recess portion are spaced apart from each other by the first flat portion.

3. The cell according to claim 2, wherein the first flat portion and the second flat portion are spaced apart from each other by the second recess portion.

4. The cell according to claim 2, wherein a depth of the first recess portion is greater than or equal to 0.001 mm and less than or equal to 0.5 mm; and a depth of the second recess portion is greater than or equal to 0.001 mm and less than or equal to 0.5 mm.

5. The cell according to claim 2, wherein a structure of the first recess portion is different from that of the second recess portion.

6. The cell according to claim 1, wherein each of the plurality of recess portions has a bottom in the shape of polygon.

7. The cell according to claim 6, wherein the polygon is at least one of triangle, parallelogram, and hexagon.

8. The cell according to claim 2, wherein a structure of the first recess portion is the same as that of the second recess portion.

9. The cell according to claim 5, wherein a shape of the first recess portion is different from that of the second recess portion.

10. The cell according to claim 5, wherein a size of the first recess portion is different from that of the second recess portion.

11. A package device, comprising a functional surface comprising a plurality of functional flat portions and a plurality of functional recess portions;

wherein each of the plurality of functional flat portions are spaced apart from each other, and each of the plurality of functional recess portions are spaced apart from each other; and the functional surface is configured to bond two package films into a sealed wing of a package of a battery cell, the package having a top sealed portion and two sealed wings, the top sealed portion including two electrode tabs extending out of the package in a length direction of the battery cell, and the two sealed wings located on two opposite sides of the top sealed portion along the length direction of the cell, each sealed wing having a first end surface corresponding to the functional surface and the first end surface extending in the length direction of the battery cell and including a plurality of flat portions matching the plurality of functional recess portions and a plurality of recess portions matching the plurality of functional flat portions.

12. The package device according to claim 11, wherein the plurality of functional flat portions comprises a first functional flat portion and a second functional flat portion; and, a structure of the first functional flat portion is different from that of the second functional flat portion.

13. The package device according to claim 12, wherein a shape of the first functional flat portion is different from that of the second functional flat portion.

14. The package device according to claim 12, wherein a size of the first functional flat portion is different from that of the second functional flat portion.

15. The package device according to claim 11, wherein each of the plurality of the functional flat portions has a shape of polygon.

16. The package device according to claim 15, wherein the polygon is at least one of triangle, parallelogram, and hexagon.

17. The package device according to claim 11, wherein the plurality of functional recess portions includes a first functional recess portion and a second functional recess portion; and, a structure of the first functional recess portion is different from that of the second functional recess portion.

18. The package device according to claim 17, wherein the plurality of functional recess portions includes a first functional recess portion and a second functional recess portion; and, the first functional recess portion and the second functional recess portion are spaced apart from each other by the first functional flat portion.

19. The package device according to claim 17, wherein the plurality of functional recess portions comprises a first functional recess portion and a second functional recess portion; and, the first functional flat portion and the second functional flat portion are spaced apart from each other by the second functional recess portion.

20. The package device according to claim 17, wherein a depth of the first functional recess portion is greater than or equal to 0.001 mm and less than or equal to 0.5 mm; and a depth of the second functional recess portion is greater than or equal to 0.001 mm and less than or equal to 0.5 mm.

21. The cell according to claim 1, wherein the two package films are being bonded by a process of fusing the two package films.

* * * * *